(12) United States Patent
Brock et al.

(10) Patent No.: US 7,806,948 B2
(45) Date of Patent: Oct. 5, 2010

(54) FILTER SYSTEM FOR INTERNAL COMBUSTION ENGINES OPERATED IN A CONTAMINATED ATMOSPHERE

(75) Inventors: James Donald Brock, Chattanooga, TN (US); Gary Heeszel, Eugene, OR (US); Jon Juhlin, Eugene, OR (US); Tom Furrer, Eugene, OR (US); Robert Carnes, Eugene, OR (US)

(73) Assignee: Johnson Crushers International, Eugene, OR (US)

( * ) Notice: Subject to any disclaimer, the term of this patent is extended or adjusted under 35 U.S.C. 154(b) by 285 days.

(21) Appl. No.: 11/939,542

(22) Filed: Nov. 13, 2007

(65) Prior Publication Data

US 2008/0110141 A1 May 15, 2008

Related U.S. Application Data

(60) Provisional application No. 60/865,769, filed on Nov. 14, 2006.

(51) Int. Cl.
*B01D 46/02* (2006.01)
(52) U.S. Cl. .................... 55/302; 55/341.1; 55/356; 55/385.1
(58) Field of Classification Search ............ 55/385.3, 55/302, 304, 431, 432, 283, 293, 284, 385.1, 55/341.1, 356; 95/280; 96/426, 427
See application file for complete search history.

(56) References Cited

U.S. PATENT DOCUMENTS

| 2,630,638 | A | | 3/1953 | Le Tourneau | |
| 4,007,026 | A | * | 2/1977 | Groh | ........................... 55/302 |
| 4,298,360 | A | | 11/1981 | Poll | |
| 4,961,762 | A | * | 10/1990 | Howeth | ....................... 55/302 |
| 5,409,512 | A | * | 4/1995 | Wilkerson et al. | ............. 55/302 |
| 5,711,785 | A | | 1/1998 | Maxwell | |
| 6,749,665 | B2 | * | 6/2004 | Bjarnø et al. | ................... 95/20 |
| 6,890,365 | B2 | * | 5/2005 | Prill | ............................. 55/302 |
| 6,942,717 | B2 | * | 9/2005 | Armstrong et al. | ............. 95/26 |
| 7,300,481 | B2 | * | 11/2007 | Scheuch | ....................... 55/302 |
| 7,479,170 | B1 | * | 1/2009 | Collette | ....................... 55/302 |
| 7,517,393 | B2 | * | 4/2009 | Richard | ....................... 95/280 |

OTHER PUBLICATIONS

U.S. Air Filtration, Inc., Maintenance Manual: Dust Collection Systems, 2001, pp. 1-14, Ontario, CA.
Fisher, Bob, StacleanTM Pleated Bag Bin Vent for Silo Dust, Oct. 22, 2004, pp. 1-5, Staclean Diffuser Company, Salisbury, NC.

(Continued)

*Primary Examiner*—Minh-Chau T Pham
(74) *Attorney, Agent, or Firm*—Schwabe, Williamson & Wyatt, P.C.

(57) ABSTRACT

A filter system for ambient air to remove airborne particulates in air that is to be used for engine operation. A filter media that is pervious to air and impervious to the particulates may be coupled to a filtered air chamber, which in turn may supply filtered air to the engine's air intake system. In various embodiments, the engine's air intake may be used utilized to draw air through the filter media into the filtered air chamber. An pressurized gas pulsing system may be used to periodically urge reverse airflow through the bag walls to maintain the permeability of the walls to the clean air.

3 Claims, 6 Drawing Sheets

OTHER PUBLICATIONS

C&W Manufacturing and Sales Co., Cartridge Pulse CP-Series Silo Dust Collectors, 2004, pp. 1-6, Louisville, KY.

Stephens Manufacturing, Inc., Dust Control Equipment & Accessory Items, 2005, pp. 1-12, Tompkinsville, KY.

Donaldson Filtration Solutions, FRG: Superior Protection for Larger Engines: RadialSeal Sealing Technology Means Reliable Filtration & Quicker Service, www.donaldson-filters.com, pp. 35-40.

Donaldson Filtration Solutions, STG Donaclone: Field Proven & Reliable: Heavy-Duty Workhorse for Construction & Off-Highway Applications, www.donaldson-filters.com, pp. 51-55.

Donaldson Filtration Solutions, SRG Donaclone Protects the Largest Engines: Designed to Fight the Worst Dust Conditions, www.donaldson-filters.com, pp. 56-59.

* cited by examiner

FILTER SYSTEM FOR INTERNAL COMBUSTION ENGINES OPERATED IN A CONTAMINATED ATMOSPHERE

RELATED APPLICATIONS

The present application claims priority to U.S. Patent Application No. 60/865,769, filed Nov. 14, 2006, entitled "FILTER SYSTEM FOR INTERNAL COMBUSTION ENGINES OPERATED IN A CONTAMINATED ATMOSPHERE," the entire disclosure of which is hereby incorporated by reference in its entirety.

FIELD OF INVENTION

The present invention relates to the field of heavy equipment utilizing combustion engines, and in particular to methods and apparatuses for providing relatively contaminant free air for use in the combustion engine.

BACKGROUND

Equipment such as rock crushers and screens used to size separate crushed rock from such rock crushers, may be operated by internal combustion engines. Such engines include a source of fuel e.g. diesel, gasoline, propane, natural gas, etc. and an air intake that conveys air to the engine's combustion chamber.

It is important for engine longevity that the air drawn from the atmosphere via the air inlet be relatively free of contaminates. Thus, such engines are provided with an air filter. Under normal circumstances, such as in road vehicles, the ambient air is satisfactorily filtered by a pleated paper engine filter just prior to directing the air to the combustion chamber. However, over time filtered particles from the ambient air will build up on the filter media, which results in progressive impedance of air passage through the filter, thus requiring a filter change. This change of filters for a road vehicle may be necessary in infrequent intervals, such as annually.

A heavy equipment engine operated at a job site, however, is generally exposed to a different environmental situation, where the amount of air contaminants/particulate can be many times greater than the density of contaminants encountered by a typical road vehicle. For example in a rock crushing operation, the rock dust that is entrained in the ambient air creates a cloud of rock dust, which can clog the air intake filter within a matter of hours of operation. Repetitively changing filters after but a few hours of operation is highly unsatisfactory and failure to do so can result in severe engine damage.

DETAILED DESCRIPTION OF EMBODIMENTS OF THE INVENTION

Figure 1:
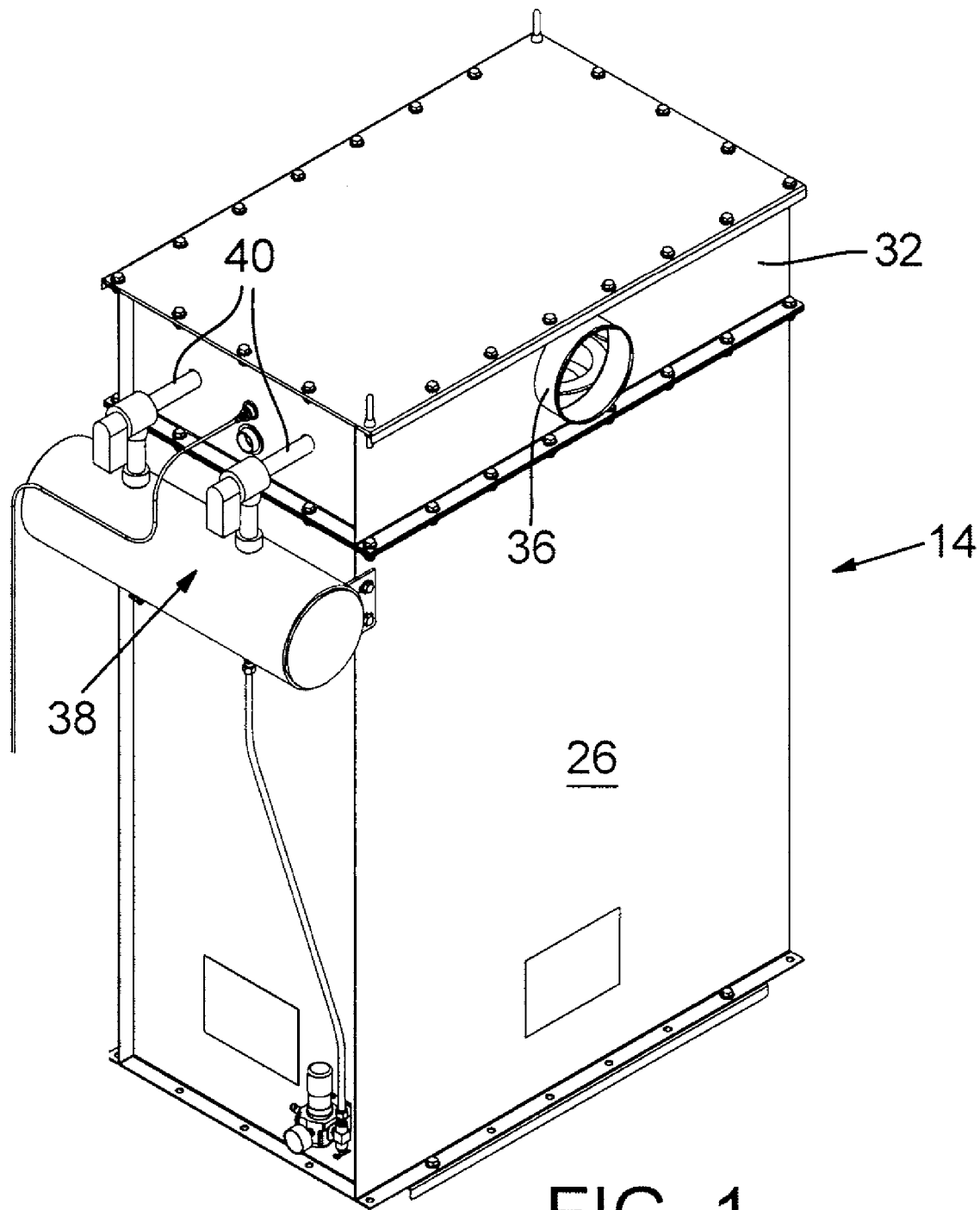
FIGS. 1-6 illustrate views of an engine filter system in accordance with embodiments of the present invention.
Figure 4:
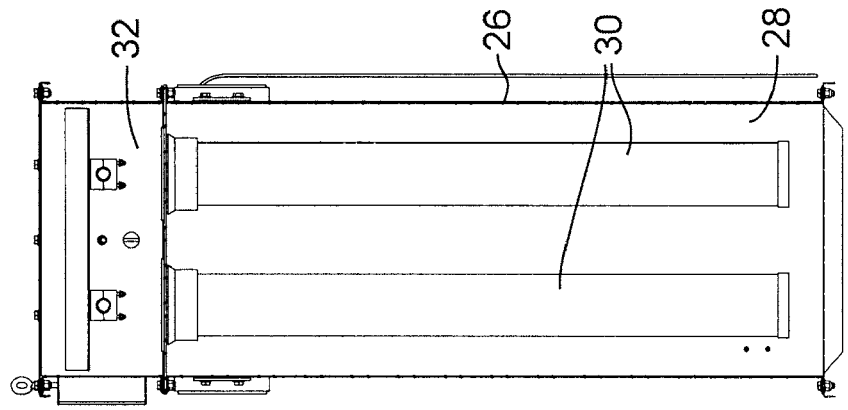
Figure 3:
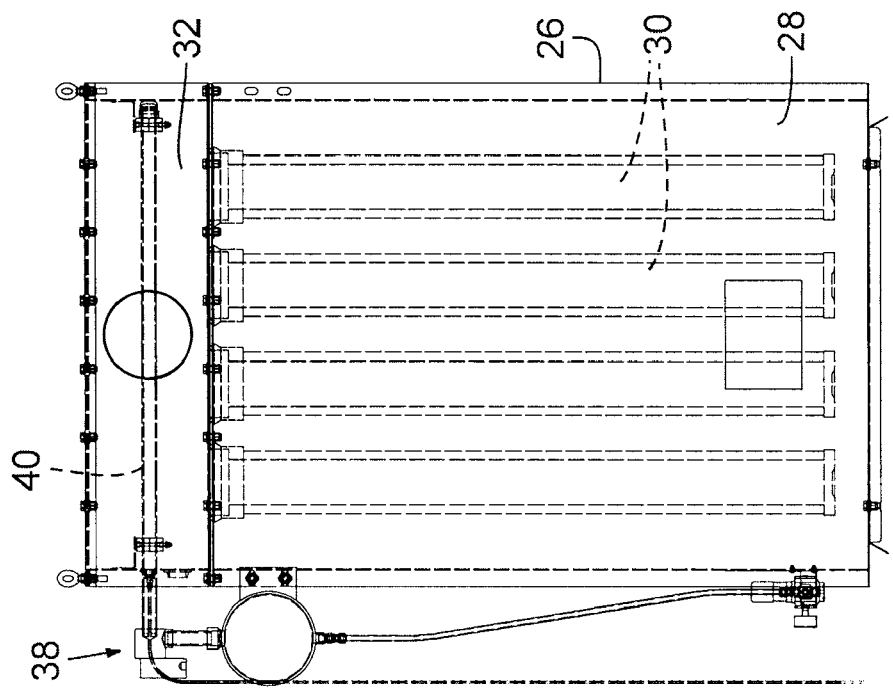
Figure 2:
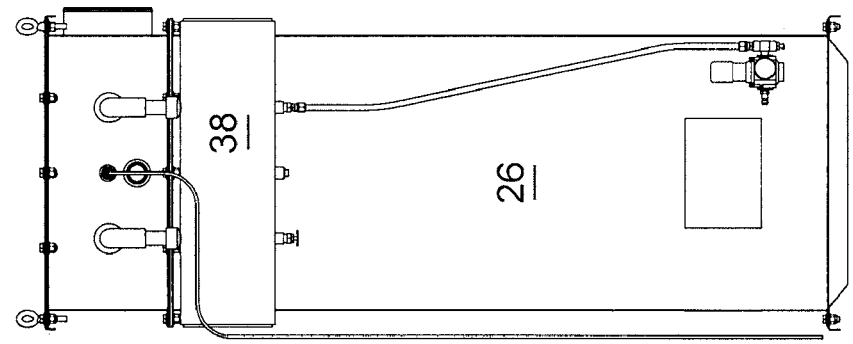
Figure 5:
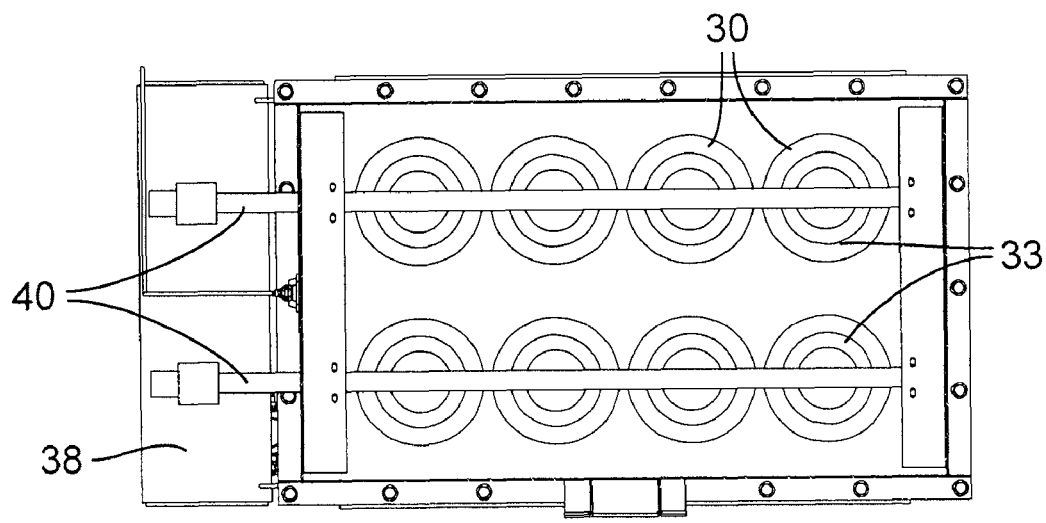
Figure 6:
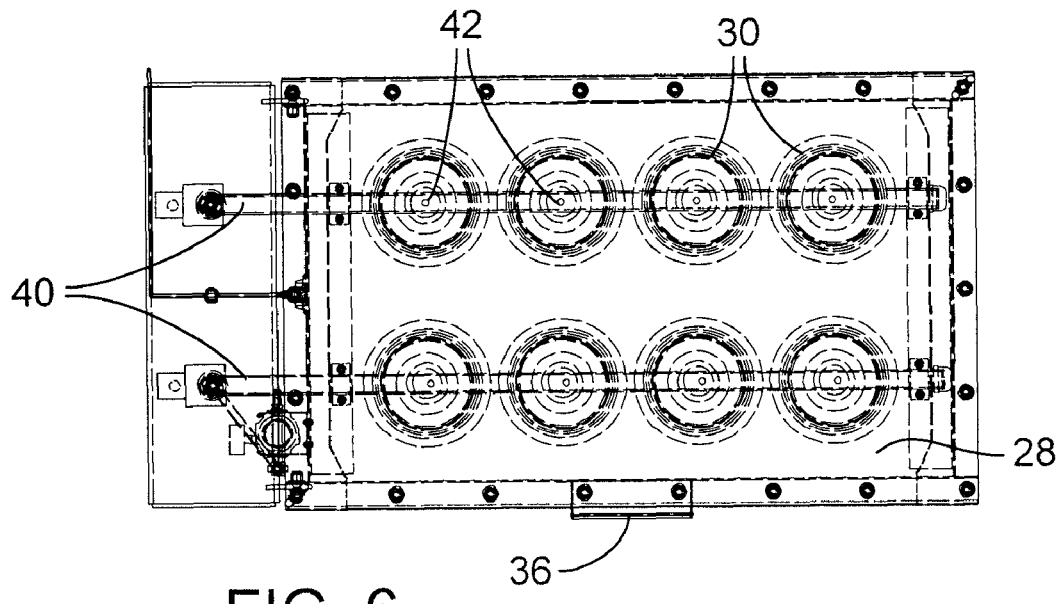

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)", that is, A is an optional element.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In various embodiments, a filter system is designed to provide sufficient quantities of clean air to accommodate the air intake requirements of an internal combustion engine powering a machine in a particularly contaminated environment e.g. for operating a rock crusher, screen, earth moving equipment and the like. In various embodiments, a filter media may disposed in a housing (either separate or as part of the engine housing) such that particulate may be filtered out of the air prior to intake into the engine. In various embodiments, the system may include an air intake housing, which supports a number of open top/end filter bags or other structured filter media, and a clean air or filtered media chamber coupled thereto. The open portion of the bags may extend from the clean air chamber and disposed within the intake housing.

In various embodiments, the bags or other filter media may be sufficiently rigid to resist collapse during operation (e.g. rigid filter media, internal structure, etc.), and may be sufficiently pervious to air (and not dust particles) to permit passage of the air through the bags into the air chamber. The intake housing may include an atmospheric air intake (e.g. the side or bottom being opened for direct exposure to atmospheric air). A suction fan associated with the clean air chamber may draw air from the atmosphere and through the bag walls and into the clean air chamber. While the air may pass there through, the dust particles/contaminants may be prevented from passing through the bags, which allows the cleansed air to be directed into the clean air chamber. Air from the clean air chamber may be routed to the engine's combustion chamber, either directly or through other stages (e.g. additional engine filters, mixing chambers, etc.)

During operation, the filtered particles may become coated on the bag surface. From time to time the accumulated particles (often referred to as cake) needs to be removed in order to provide a sufficient amount of air to the engine. In various embodiments, a pulsing system may be used to periodically direct bursts of air or other compressed gas to the clean side of the filter media and/or in the mouths of the bags. These bursts of gas may cause a reversal of flow and/or a shocking action that can produce sloughing off of the cake such that the pieces drop to the bottom of and/or out of the housing, thereby unrestricting the passage of air.

Figure 8:
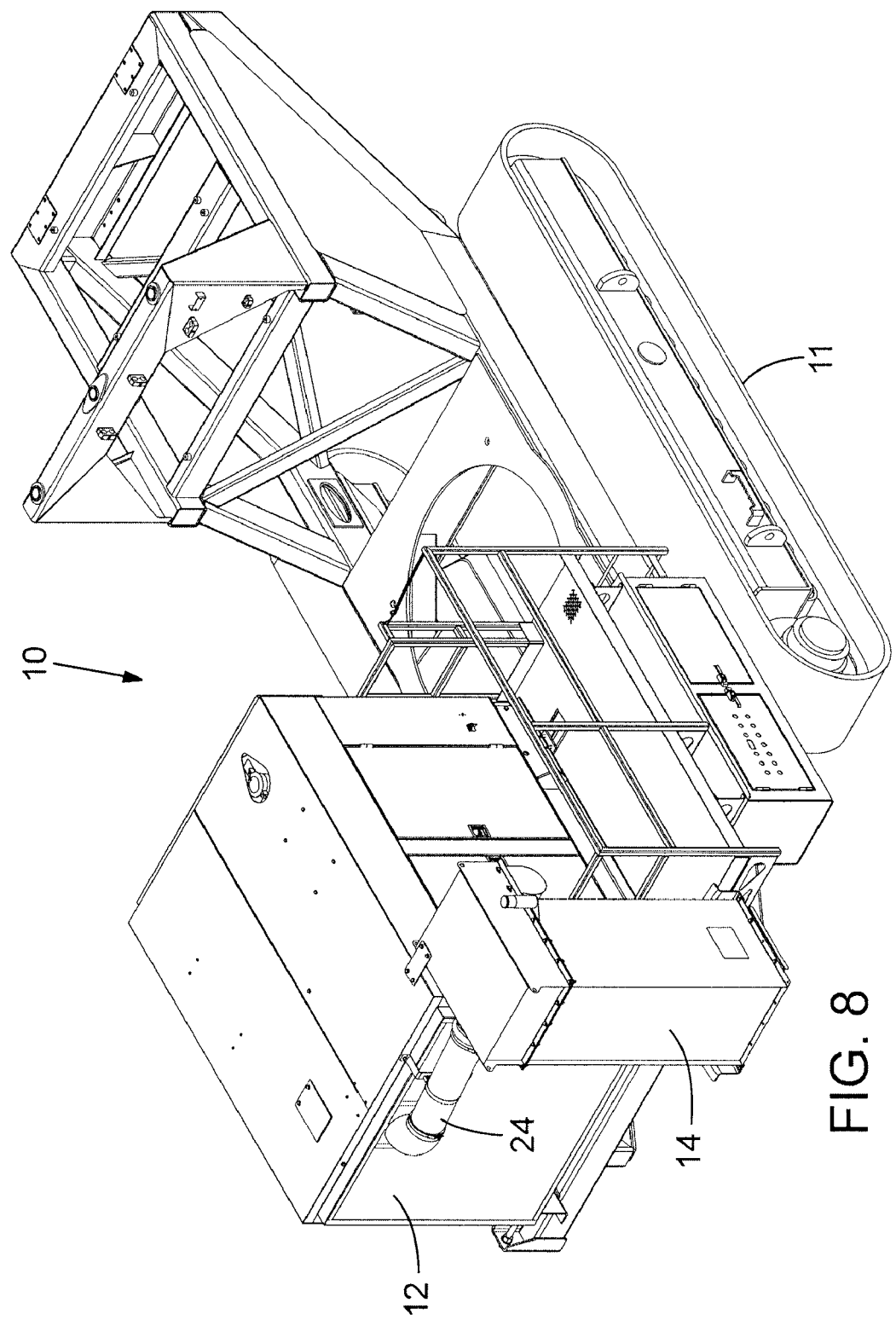
FIG. 8 illustrates a filter system in accordance with embodiments of the present invention as used in conjunction with an internal combustion engine on a rock crusher.
Figure 9:
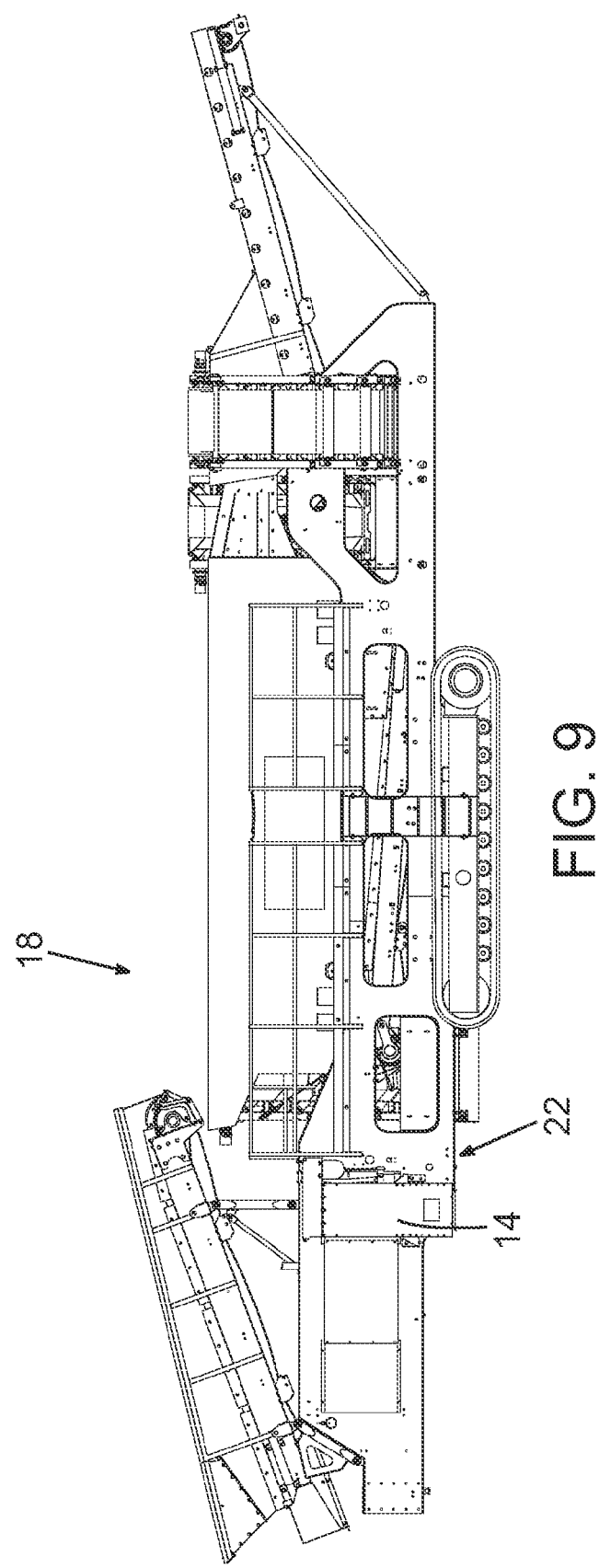
FIG. 9 illustrates a filter system in accordance with embodiments of the present invention as used in conjunction with an internal combustion engine on a screen apparatus.

In various embodiments, the desired flow rate and pressurized gas pulses may be configured such that the cake may be urged off the bag by virtue of the pulsing of air. In one embodiment, the pulse may be limited such that it is not so great as to cause undue fragmentation of the cake. Such fragmentation of the cake is not desirous, as it renders the cake particles to become air born again and allows for refiltration of the same particles FIG. 8 illustrates a perspective view of a portion of a aggregate processing unit, which is a rock crusher frame as indicated by arrow 10. An internal combustion engine may be disposed in engine housing 12 and may be adapted to drive the crushing components of crusher 10 and/or prime movers 11. A filter house/system 14 in accordance with various embodiments may be coupled to the engine via conduit 24. The crushed rock may be conveyed to another aggregate processing unit, such as a screen 18, an example of which is illustrated in FIG. 9. Also powered by an internal combustion engine, the screen apparatus may cause the crushed rock to pass through several levels of screening such that the rock is separated by size. The size sorted material may then be conveyed for stockpiling and/or further processing. A second filter house/system 14' may be coupled to the engine disposed in engine hosing 22. In both aggregate processing unites 10 and 18, a conduit 24 may direct clean air from the filter house to the engine of the material processing unit.

Reference is now made to FIGS. 1-6, which illustrate various views of an engine filter system in accordance with various embodiments that may be used to provide filtered air to engines on aggregate processing units and other heavy equipment. As described such equipment may operate in an environment where an excessive amount of dust and debris may be generated. In various embodiments, the engine air intake filter system may include a housing 26 having an open bottom 28 for ambient air intake, though the opening could be in other parts of the housing. Disposed in housing 26 may be a plurality of air permeable bags 30 comprised at least in part of a filtration media which permits passage of the air while restricting passage of suspended particles of a determined size. Whereas the bags 30 are air pervious they may also be constructed to resist collapsing to the point where air may not be drawn there through. IN various embodiments, an internal frame may be disposed within the filter media and/or bags to resist collapse. In other embodiments, the filter or bag material itself may be structurally rigid such that collapse may be resisted.

Generally overlying the bags 30 may be a clean air chamber 32, which may also be referred to as a filtered media chamber. The bags 30 may have open tops 33 opened to the clean air chamber 32. In various embodiments, an outlet 36 may be coupled to clean air chamber 32 and adapted for coupling to an engine air intake system via conduit 24 (see, e.g. FIGS. 8-9) for further filtering and/or treatment. In various embodiments, the clean air may be diverted directly to the combustion chamber without additional filtering or treatment (e.g. cooling, heating, etc.).

In operation, the engine intake system via conduit 24 may produce a suction that pulls air out of chamber 32 and into an engine filter or directly into the combustion chamber of the engine. This produces air flow through the open area 28 of the housing 26, through the side walls of the bags 30 and into clean air chamber 32. In the process, contaminants/particulate (e.g. rock dust) may be prevented from passing into the clean air chamber 32. As the particulate becomes deposited on the sidewalls it may continues to build in thickness as the air flow continues. While the early stages of particle build up/deposit may actually assist the filtering process, as the particles continue to build into a cake the air flow becomes undesirably impeded.

In various embodiments, a pressurized gas pulsing system may be coupled to the filter system and adapted to shock the filter media and help remove some of the built up cake. In one embodiment, a pressurized air source 38 may produce a pulse of air directed through conduits 40. The conduits 40 may be provided with openings and/or nozzles 42 positioned at the mouth/opening of each of the bags 30. The gas/air pulse may be controlled e.g. by sensors, timing switch and/or manually, whereby the pulsing system may direct a burst of air or other media into the bags 30. This reverse air movement may produce a shock to the bags, which in turn may cause a sloughing off of the particle cake (or at least a portion of the cake). The cake may fall through the open bottom 28 and/or be removed e.g. via a conveyor or other means not illustrated.

Figure 7A:
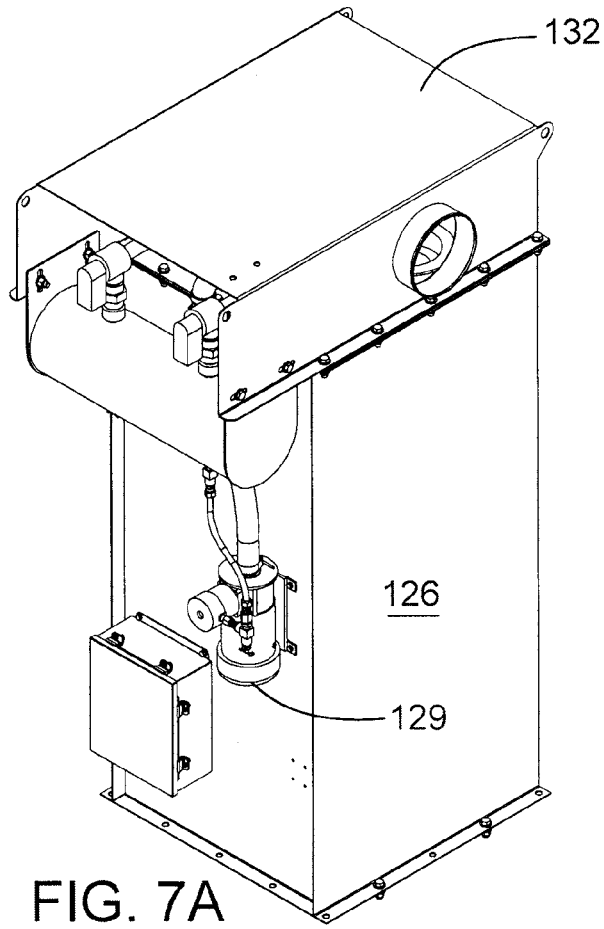
FIGS. 7A-7C illustrate views of an engine filter system in accordance with embodiments of the present invention.
Figure 7C:
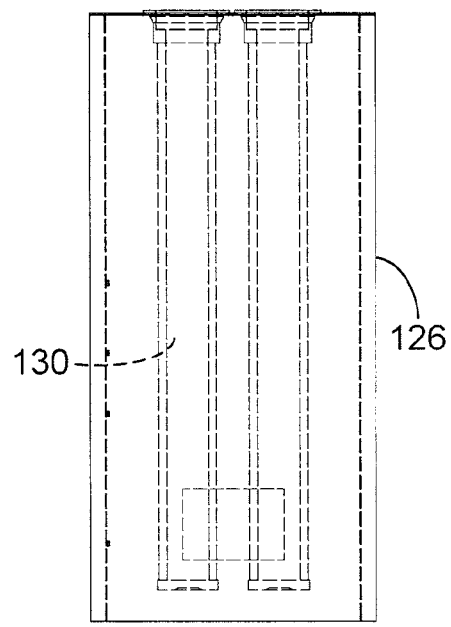
Figure 7B:
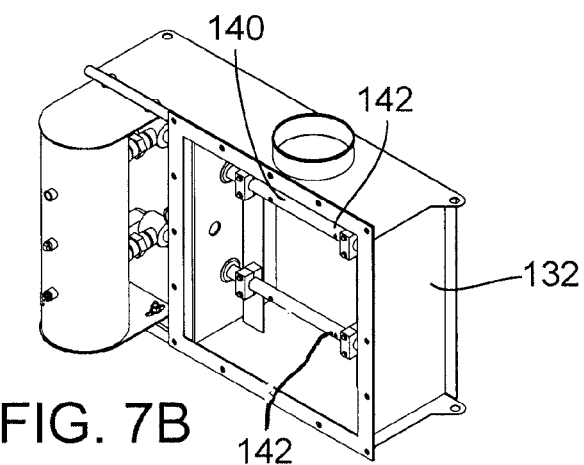

The number, orientation and/or configuration of the bags or other filter media may be varied depending on a variety of factors, including, but not limited to contaminant characteristics, contaminant concentration, engine size, air flow requirements, machine configuration, and the like. By way of example, a four bag filter system is illustrated in FIGS. 7A, 7B and 7C. The filter system illustrated includes four bags 130 or filter media disposed within housing 126. Clean Air chamber 132 is coupled to housing 126. A pulsing system includes conduits 140 and nozzles 142 disposed over the open end of bags 130 in order to shock the bags with a media pulse. A compressor 129 may provide the source of pulsed air. In various embodiments, a controller may direct a burst of air to a first pair of the bags, while the other two bags remain functional to allow air to be drawn into the clean air chamber. Based on a timed or other cycle, the second pair may be pulsed, while the first pair continues to function. In various embodiments, the bags may be pulsed individually.

A consideration of the pulsing system in accordance with various embodiments may be the avoidance of starving the engine of sufficient air during the purging cycle which potentially may cause engine stall out due to lack of air, or engine instability due to engine sensors over reading the change in pressure differential or even damage to the engine intake turbo charge system. Such avoidance may be accomplished by the application of a pulsing system that cycles on a desired interval or based on a percentage of build up. In one embodiment, a cycle may include pulsing a portion of the filter media and/or bags with a burst of gas or air thereby allowing the remaining portion of media/bags to continue providing filtered air to the clean air chamber and thus the engine. Once the purged dust and material of that portion of the filter bags settle and discharge out of the bag-house, the remaining portion or portions of filter bags may similarly be purged. Gas pulses may be controlled by, for example, programmed pulsed time, dwell time, purge air pressure and purge air flow.

A further consideration in accordance with various embodiments is the incorporation of some of the filter house components (e.g. bags and part or all of the air jet system) into the engine housing as differentiated by the separate filter housing illustrated in the drawings. In various embodiments, bag houses in accordance with embodiments of the invention may be used with stationary and non stationary equipment operating in dust and debris ladened environments. In various embodiments, the pulsed media source may be a pressurized gas or other form. In various embodiments, the filter media may be treated with a material that may resist particulate build up, such as Teflon, silicon, etc.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

The invention claimed is:

1. Portable equipment adapted for movement from work site to work site and powered by an internal combustion engine which may require operation in an environment where the ambient air is contaminated by dust particles, said engine requiring an ambient air and fuel mixture for said operation, and said ambient air contamination being detrimental to said internal combustion engine; said equipment including:

a filter house/system including multiple filtering bags contained at least partially in a housing, an inlet opening in said filter house through which contaminated air enters the housing and surrounds the filtering bags, a chamber sealed from contaminated air surrounding the bags and open to the interior of the bags and further including an air conduit for conveying filtered air from the chamber directly to an air intake of said internal combustion engine that is otherwise closed to said ambient air, whereby said intake draws filtered air from the chamber for mixing with the fuel, which air is substantially free of said contaminants.

2. Portable equipment as defined in claim 1 wherein said filter house/system includes a pressurized gas pulsing system operative to periodically eject gas in reverse flow through the filtering bags to purge the contaminants from the bag exterior.

3. Portable equipment as defined in claim 1 wherein the filter/house system is sized to the requirements of the air flow needs of the internal combustion engine.

\* \* \* \* \*